(12) United States Patent
Ito

(10) Patent No.: US 7,788,232 B2
(45) Date of Patent: Aug. 31, 2010

(54) FILE MANAGEMENT PROGRAM FOR OVERWRITING FILE

(75) Inventor: Atsushi Ito, Yawata (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 154 days.

(21) Appl. No.: 11/002,457

(22) Filed: Dec. 3, 2004

(65) Prior Publication Data

US 2006/0080333 A1    Apr. 13, 2006

(30) Foreign Application Priority Data

Sep. 14, 2004   (JP)   .............................. 2004-267222

(51) Int. Cl.
*G06F 7/00*     (2006.01)
*G06F 17/00*    (2006.01)

(52) U.S. Cl. ..................... 707/661; 707/640; 707/674; 707/999.2; 707/999.202; 707/999.204

(58) Field of Classification Search ......... 707/640–689, 707/999.2–999.204, 1, 204
See application file for complete search history.

(56) References Cited

U.S. PATENT DOCUMENTS

| | | | | |
|---|---|---|---|---|
| 5,379,424 A | * | 1/1995 | Morimoto et al. ............... | 707/2 |
| 5,991,542 A | * | 11/1999 | Han et al. .................... | 717/167 |
| 6,016,553 A | * | 1/2000 | Schneider et al. ............. | 714/21 |
| 6,377,977 B1 | * | 4/2002 | Sakata ........................ | 709/205 |
| 6,470,345 B1 | * | 10/2002 | Doutre et al. ................ | 707/100 |
| 6,611,850 B1 | * | 8/2003 | Shen ................... | 707/999.204 |
| 6,633,893 B2 | * | 10/2003 | Yahara et al. ................ | 707/205 |
| 2002/0033762 A1 | * | 3/2002 | Belu ............................ | 341/87 |
| 2002/0150391 A1 | * | 10/2002 | Hara ............................ | 386/95 |
| 2003/0040917 A1 | * | 2/2003 | Fiedler ....................... | 704/500 |

FOREIGN PATENT DOCUMENTS

| | | |
|---|---|---|
| JP | 01-240943 | 9/1989 |
| JP | 05-233404 | 9/1993 |
| JP | 06-187345 | 7/1994 |
| JP | 06-301586 | * 10/1994 |
| JP | 07-319859 | * 12/1995 |
| JP | 11-102362 | 4/1999 |

(Continued)

OTHER PUBLICATIONS

The English translation for JP Publication No. 07-319859 by Takahashi Toru, Dec. 8, 1995.*

(Continued)

*Primary Examiner*—John E Breene
*Assistant Examiner*—Hares Jami
(74) *Attorney, Agent, or Firm*—Buchanan Ingersoll & Rooney PC

(57) ABSTRACT

In writing a new file over an existing file, if it is set that the existing file is to be stored into an archive, it is confirmed whether or not there is an archive file for the existing file, and the existing file is stored into the archive file. After the existing file is stored into the archive file, the new file is written over the existing file and stored. By performing such a process, a file management program product is provided that can suitably execute an overwriting process while considering the convenience of a user and can protect the original file.

20 Claims, 9 Drawing Sheets

FOREIGN PATENT DOCUMENTS

| | | |
|---|---|---|
| JP | 2002-312209 | 10/2002 |
| JP | 2003-058403 | 2/2003 |

OTHER PUBLICATIONS

The English translation for JP Publicatin No. 06-301586 by Terao Yuichi, Oct. 28, 1994.*

DOS/V Special "Appli No Tatsujin Yosei Koza Saishu-Kai" (Jul. 1, 2003) vol. 8, No. 7, pp. 166-169 (with partial English translation).
Windows Start "Back-Up Wo Okonau Maeni Shitteokitai Kiso Chisiki" (Jan. 29, 2004) vol. 9, No. 3, pp. 42-51 (with partial English translation).
Japanese Office Action dated Nov. 27, 2007 (with English Translation).

* cited by examiner

FIG.5

| OVERWRITING PROCESS   USER-DEFINED VALUE SETTING |
|---|

SET OPERATIONS IN OVERWRITING PROCESS

● STORE EXISTING FILES INTO ARCHIVE
  STORAGE CONDITIONS:
  ☐ UPPER LIMIT OF THE NUMBER OF STORED FILES     3  FILES
  ☐ DAYS FOR STORAGE                             20  DAYS
  ☑ COMPRESS IN STORING FILE
○ DO NOT STORE EXISTING FILES
○ STOP OVERWRITING PROCESS

☐ DISPLAY THIS MESSAGE EACH TIME
   OVERWRITING PROCESS IS EXECUTED     [Cancel]  [OK]

FIG.6

| |
|---|
| ARCHIVE FILE HEADER <br> Total files=2 |
| FILE HEADER <br> Name=Sample.txt <br> Size=21.2KB <br> Ratio=12.1% <br> Date=2003/7/1 <br> Path=¥Main Folder¥Sub Folder |
| FILE BODY <br> Sample.txt <br> ---------------------------------------------------- <br> ---------------------------------------------------- <br> ---------------------------------------------------- <br> ------------------------------------------- [EOF] |
| FILE HEADER <br> Name=Sample.txt <br> Size=23.7KB <br> Ratio=12.5% <br> Date=2004/2/12 <br> Path=¥Main Folder¥Sub Folder |
| FILE BODY <br> Sample.txt <br> ---------------------------------------------------- <br> ---------------------------------------------------- <br> ---------------------------------------------------- <br> ------------------------------------------- [EOF] |

FIG.9

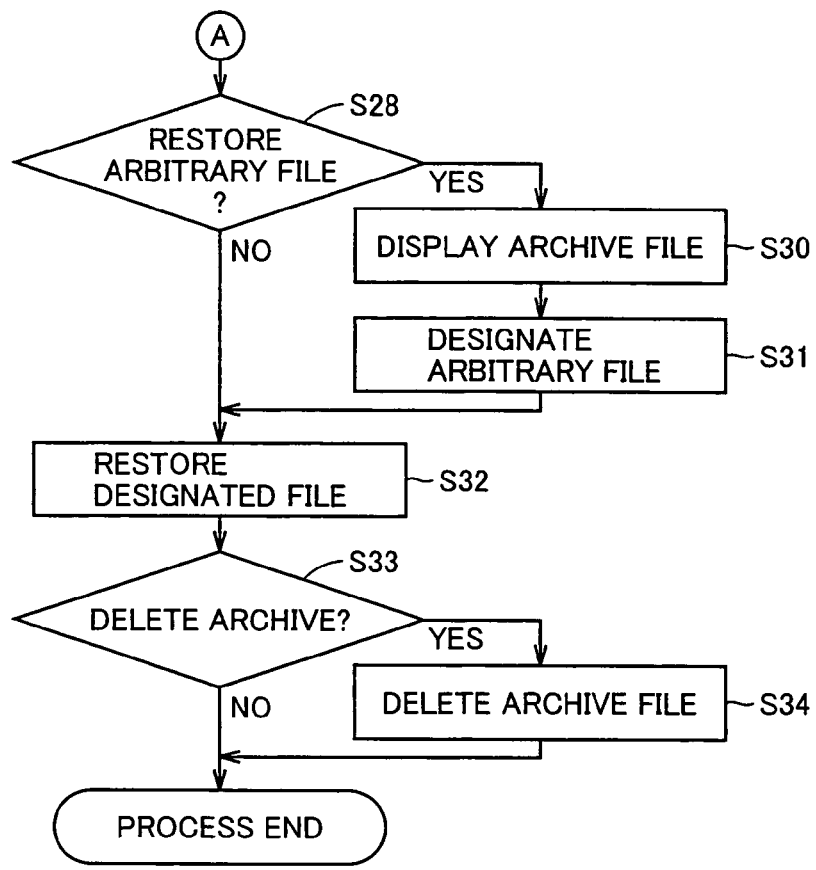

FIG.10

| MOVING PROCESS   USER-DEFINED VALUE SETTING |
|---|
| SET OPERATIONS OF ARCHIVE FILE IN MOVING PROCESS<br><br>● MOVE ARCHIVE FILE TOGETHER WITH FILE<br>○ RESTORE FILE TO CURRENT POSITION FROM ARCHIVE<br>   ○ RESTORE ARBITRARY FILE FROM FILE LIST IN ARCHIVE<br>   ○ RESTORE LATEST FILE IN ARCHIVE<br>      ☑ DELETE ARCHIVE FILE AFTER RESTORATION<br>○ DELETE ARCHIVE FILE<br>☐ DISPLAY THIS MESSAGE EACH TIME<br>   MOVING PROCESS IS EXECUTED<br><br>                                              Cancel    OK |

| File Name | size | ratio | Date | path |
|---|---|---|---|---|
| Sample.txt | 51.2 | 23.2 | 2004/2/12 | ¥Sub Folder |
| Sample.txt | 53.7 | 23.6 | 2004/3/27 | ¥Sub Folder |

OK

FILE MANAGEMENT PROGRAM FOR OVERWRITING FILE

This application is based on Japanese Patent Application No. 2004-267222 filed with the Japan Patent Office on Sep. 14, 2004, the entire content of which is hereby incorporated by reference.

BACKGROUND OF THE INVENTION

1. Field of the Invention

The present invention relates to a file management program and a file management method, more particularly, a file management program and a file management method for overwriting a file.

2. Description of the Related Art

Conventionally, an auxiliary storage device for storing documents and images is known. In an auxiliary storage device, documents and images are stored in a form of a file. A file management device or the like for managing such a file is known.

In storing a file, if a file having the same name already exists, a message is generally displayed to confirm with a user how to deal with it, and the file is overwritten for storage when an instruction for overwriting storage is given.

Here, Japanese Laid-Open Patent Publication No. 07-319859 proposes a technique such that, in storing a document, if a file having the same name already exists, the existing file is protected by changing the name of the existing file.

Further, Japanese Laid-Open Patent Publication No. 06-301586 proposes a technique such that, in deleting a file, the file is moved to a buffer by changing the extension of the file name.

Japanese Laid-Open Patent Publication No. 2002-312209 discloses that an image file is compressed for storage so as to prevent cut-off of the linkage to an image whose term of storage has expired.

If a device is constructed so that, in storing a file, when a file having the same name already exists, a message is displayed to confirm with the user how to deal with it, the following problem is raised. In copying a large amount of files for back-up use or the like, if a file having the same name exists in the copy destination, a message is displayed to confirm with the user how to deal with it, thereby interrupting the copying work.

On the other hand, if all the files are overwritten, the files that must be originally preserved may be lost by erroneous overwriting.

In the above-described technique of Japanese Laid-Open Patent Publication No. 07-319859, the number of files with a changed name (temporarily stored document) is limited to one, so that the temporarily stored document is rewritten every time a file is overwritten for storage. For this reason, in overwriting a plurality of files for storage, only the file that was last overwritten for storage is protected, so that the effect of back-up is small.

SUMMARY OF THE INVENTION

The present invention has been made in order to solve the aforementioned problems of the conventional art, and an object thereof is to provide a file management program product and a file management method that can appropriately execute an overwriting process while considering the convenience of a user and can protect the original file.

In order to achieve the aforementioned object, a file management program product according to one aspect of the present invention makes a computer execute an inputting step of receiving an input for writing a second file over a first file for storage, and a storing step of storing the first file or the second file into an archive file when the input of overwriting storage is received.

According to the present invention, when an input for writing a second file over a first file for storage is received, the first file or the second file can be stored into an archive file. Thus, a file management program product can be provided that can appropriately execute an overwriting process while considering the convenience of a user and can protect the original file.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a view illustrating a user-defined value setting screen for the overwriting process;

FIG. 6 is a view illustrating a configuration of an archive file;

FIG. 9 is a flowchart succeeding to FIG. 8;

FIG. 10 is a view illustrating a user-defined value setting screen for a moving process;

DESCRIPTION OF THE PREFERRED EMBODIMENTS

Hereafter, embodiments of the present invention will be described with reference to the attached drawings.

In the embodiments of the invention, when a file having the same name is stored by overwriting (including the storage by overwriting as a result of copying or moving), the original existing file is stored into an archive. Also, a plurality of existing files can be stored into one archive file.

Namely, when a user attempts to store a file having the same name by overwriting, the new file having the same name is stored after the existing file having the same name is stored into an archive. Thereafter, when a user attempts to store another new file having the same name, the former file having the same name is stored into the archive file by appending.

Hereafter, a case will be described in which the present invention is applied to a file management application software that manages folder-to-folder copy and movement of files.

Figure 1:
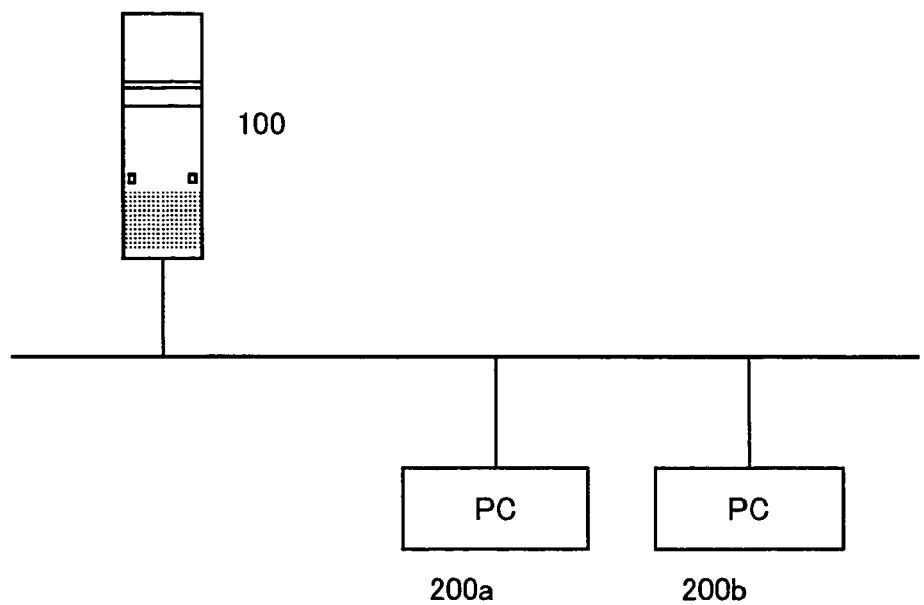
FIG. 1 is a view illustrating a network constituted of a server and personal computers on which a file management program according to an embodiment of the present invention is mounted.

With reference to FIG. 1, a network is connected to a server 100 and a plurality of personal computers 200a, 200b on which a file management program is mounted.

Figure 2:
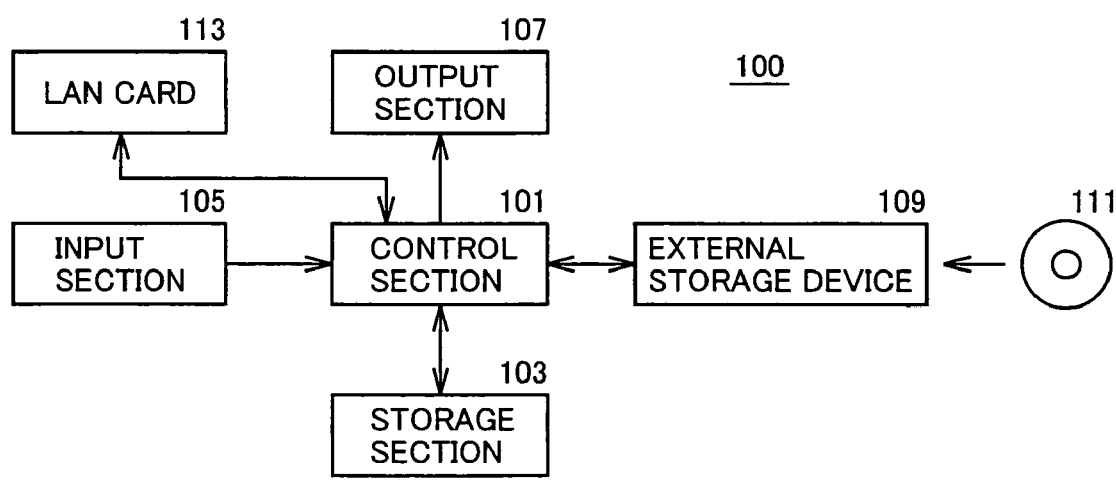
FIG. 2 is a block diagram illustrating a schematic construction of a server 100 and a personal computer 200a or 200b of FIG. 1.

FIG. 2 is a block diagram illustrating a schematic construction of server 100 and personal computer 200a or 200b of FIG. 1.

With reference to FIG. 2, server 100 or the personal computer includes a control section 101 for performing control of the whole apparatus, an input section 105 for inputting data, a storage section 103 for storing data, an output section 107 for outputting data, an external storage device 109 for storing programs that are executed in control section 101, and a LAN (Local Area Network) card 113 for connecting to a network.

Control section 101 has a central processing unit (CPU), a read only memory (ROM) for storing programs that are executed in this CPU, and a random access memory (RAM) for storing variables and others that are needed in executing the programs in the CPU.

Input section 105 is a keyboard or a mouse, and is capable of inputting characters or numerals, or inputting predetermined instruction commands.

Storage section 103 stores data of files such as documents and images. These data are, for example, data files created by an application program of a word processor, data files created by an application of a table calculation software, data files for storing images read by a digital camera, an image scanner, or the like, and data files created by various other application programs.

Storage section 103 has a plurality of folders, so that the data files can be stored by being classified into folders. For example, one folder A may store data files created by a word processor, and another folder B may store data files created by an application software for table calculation. Further, a folder may be created for each case, or folders may be created by sectioning the dates on which the data files were created, at predetermined intervals. These folders are created by various application programs.

Output section 107 is a display, which displays data files with a thumbnail or an icon in accordance with an instruction of control section 101. This allows simultaneous display of a plurality of data files.

External storage device 109 reads programs and data recorded in a computer-readable recording medium 111 and transmits the programs and data to control section 101. Further, external storage device 109 writes necessary data into computer-readable recording medium 111 by an instruction from control section 101.

As the computer-readable recording medium 111, one can raise, for example, media that carry programs in a fixed manner, including tape media such as a magnetic tape and a cassette tape, disk media such as a magnetic disk (flexible disk, hard disk device, and the like) and an optical disk (CD-ROM/MO/MD/DVD and the like), card media such as an IC card (including a memory card) and an optical card), and semiconductor memories such as a mask ROM, an EPROM, and a flash memory. Recording medium 111 can be a medium that carries programs that are downloaded from a network.

By reading a file management program recorded in recording medium 111 with external storage device 109, control section 101 can execute the programs that are read.

Figure 3:
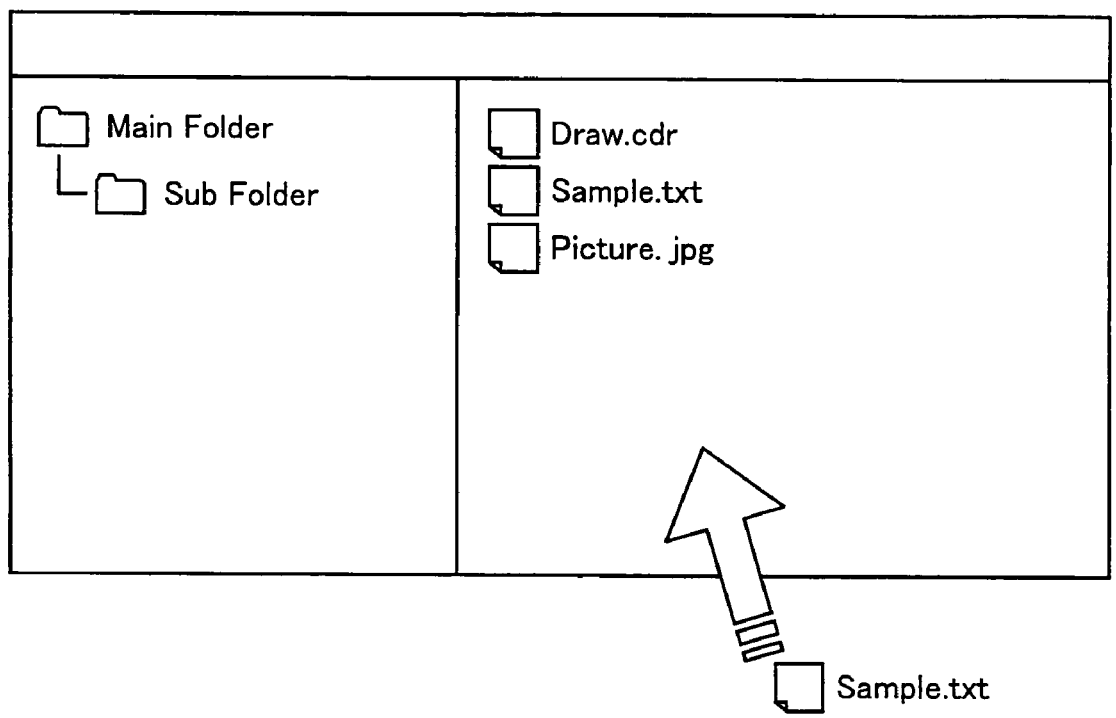
FIG. 3 is a view illustrating a state in which a data file is displayed on an output section 107 of FIG. 2.

FIG. 3 is a view illustrating a state in which data files are displayed on output section 107 of FIG. 2.

With reference to FIG. 3, folders are displayed here in a pane on the left side of the screen, and files within the folders are displayed in a pane on the right side of the screen. For example, a screen displayed by an application such as the Explorer of the Windows (registered trade mark) is assumed.

Here, it is shown that three files of Draw.cdr, Sample.txt, and Picture.jpg are present in a folder called Sub Folder.

An operation will be described in the case of copying a file called Sample.txt, which has the same name as a file present in the folder, into this folder. Here, in the following description, for the sake of convenience, the file that originally exists will be referred to as "existing file", and the file to be overwritten will be referred to as "new file".

Figure 4:
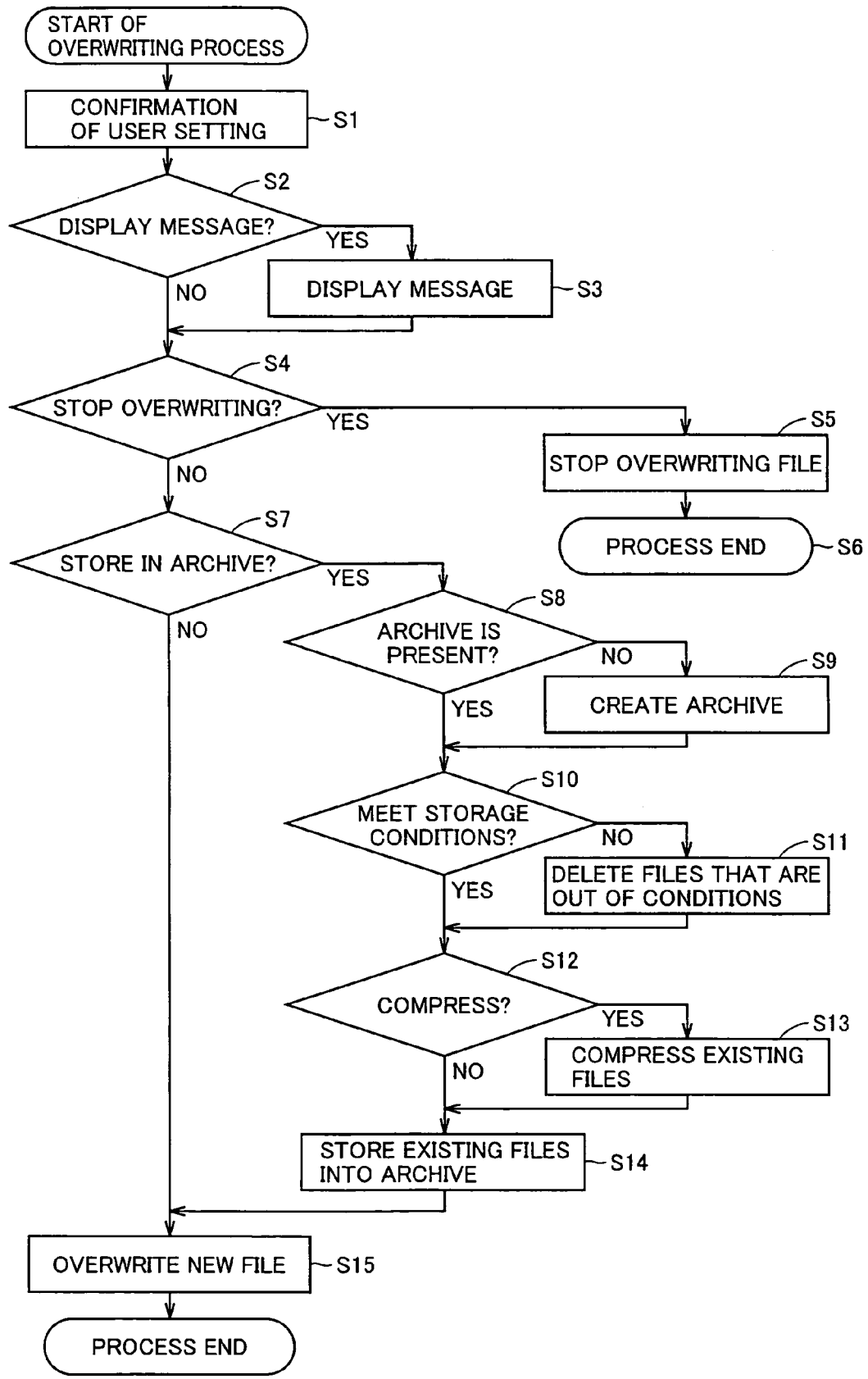
FIG. 4 is a flowchart for describing an overwriting process executed by the file management program.

FIG. 4 is a flowchart for describing an overwriting process that is executed by a file management program.

When it is understood that a file is to be overwritten, the processing routine of FIG. 4 is started.

First, the program confirms the user's setting information (S1). This setting information refers to the information that is set on a screen that lets the user set the operations at the time of the overwriting process in advance, and is prepared in an application program.

Namely, with reference to FIG. 5, as user-defined value setting of the overwriting process, the setting of the operations at the time of the overwriting process is carried out.

Here, the user can select any process from among the three processes of (1) storing the existing file into an archive, (2) not storing the existing file, and (3) stopping the overwriting process, at the time of the overwriting process.

Further, in the case of storing the existing file into an archive, the user can set the upper limit of the number of stored files, the term (days) of storage, and whether the file is to be compressed or not for storage, as the storage conditions thereof.

Also, the user can set that the message shown in FIG. 5 is to be displayed each time the overwriting process is executed.

Among the above-described choices, (1) is a setting such that the existing file is overwritten after the existing file is stored into an archive file; (2) is a setting such that the existing file is overwritten without storing the existing file into an archive file; and (3) is a setting to stop or to interrupt the overwriting process.

This setting screen may be displayed to let the user do the setting every time the process of overwriting storage occurs; however, a setting of not displaying the message may be provided, as shown in FIG. 5, so that the process may be carried out using the setting as the defined values without asking the user again. This allows that, in copying a large amount of files, the copying can be completed under the conditions set here without stopping the copying operation even if the duplicated file name exists at the copy destination.

Returning to FIG. 4, it is confirmed in step S2 whether the setting of displaying the message is selected in the setting of FIG. 5 and, if it is selected, the display of FIG. 5 is carried out (S3). Here, the user can change the setting from the displayed contents in accordance with the needs.

If the setting to stop the overwriting process is selected on the basis of the setting on the screen of FIG. 5 (YES in S4), the process of overwriting the file is stopped (S5), and the overwriting process is terminated (S6). At this time, both the existing file and the new file to be overwritten are retained at their original positions.

It is confirmed whether or not the setting of storing the file into an archive is selected on the basis of the setting on the screen of FIG. 5 (S7) and, if the setting is not selected (the setting of "not storing the existing file"), the process is completed by overwriting the existing file (S15).

If the setting of storing the file into an archive is selected (YES in S7), it is confirmed whether an archive for that file is present or not (S8). If the archive is not present, a vacant archive file is created (S9). The file name of the archive file is one that is obtained by changing only the extension of the file name of the relevant file.

For example, if the file has a file name of sample.txt as shown in FIG. 3, the archive file will have a file name of sample.arc (the extension is arbitrary). It is presupposed that one archive file exists for one file in one-to-one correspondence; however, if a different file having a file name of sample.doc is present in the same folder, the archive file name will be in duplication. In such a case, a numeral may be added to the file name, such as in sample1.arc, or alternatively, the original name including the extension may be regarded as a file name so that variations such as sample.txt.arc or sample.doc.arc may be used.

It goes without saying that the letters to be added to differentiate the file names are not limited to numerals alone. Also, different files may be stored into one archive file.

If an archive file is prepared, the storage conditions are confirmed (S110). Here, as shown in FIG. 5, the following three are raised as examples of the storage conditions.
 a) upper limit of the number of stored files
 b) term (days) of storage
 c) compress for storage
These can be simultaneously set.

The upper limit of the number of stored files is for designating the upper limit of the number of files to be stored into an archive file. For example, if the upper limit is designated to be three files and if the file to be stored next is the fourth file, one file is deleted from the archive file (S11). The file to be deleted is assumed to be the oldest file among the stored files; however, arbitrary designation can be made.

Next, regarding the term (days) of storage, this is to designate the upper limit of the number of days in which the file is stored in an archive file. For example, if it is designated to be twenty days and if files that have passed the term of twenty days are present in the archive file at the time of confirmation, all such files are deleted (S11).

Here, the number of days for storage is raised as an example; however, the term may be designated according to an actual calendar (for example, designation such as "delete the files stored before Jan. 1, 2004").

Next, regarding the compression at the time of storage, if this is set, the existing file to be stored into an archive is compressed (S12, S13). A compression format such as ZIP or LZH is well known in the art. The same compression format may be applied to each file; however, the compression format can be changed in accordance with the kind of the file. The kind of the file means a document, an image, or the like, and also means a structure of the file such as BMP or JPG. For example, in the case of a file format such as JPG by which the compression effect cannot be greatly expected, one can devise so as not to compress the file by being associated with the extension. This allows cutting-off of the time for executing the ineffective compression.

After the process on the existing file to be stored into the archive file and the process on the archive file serving as the storage destination are finished as described above, the existing file is stored into the archive file (S14).

FIG. 6 is a view illustrating a construction of an archive file.

An archive file is assumed to have a construction such as shown in FIG. 6, for example, in which a header section, which shows an existing file name, a file size, a compression ratio, a date, a file path, and the like, and a file body are alternately combined.

Here, the archive itself may be a known compressed file, for example, having a ZIP format. If the archive has a known compression format, the display software of the format is used, and if the archive has an original format, the display software of the original format is used, so as to display the contents of the archive file as shown in FIG. 7.

Figure 7:
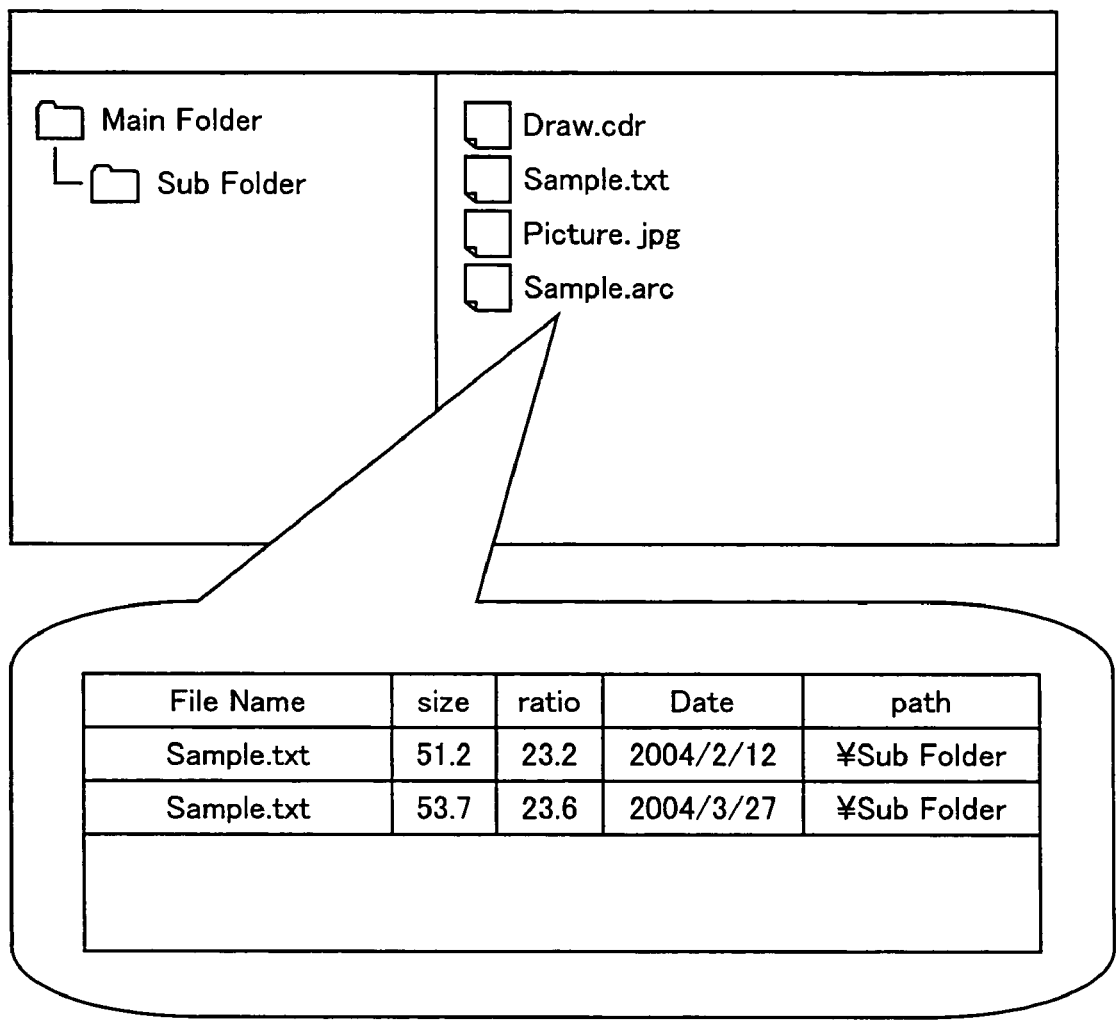
FIG. 7 is a view illustrating a display example of the contents of an archive file.

Namely, in FIG. 7, the contents of the archive file Sample.arc are displayed.

After the storage into the archive file is completed, the new file is written over the existing file for storage, so as to escape from the processing routine (S15).

For example, if a plurality of files are to be overwritten, this processing routine is passed through for each of the files.

As previously described, if the setting is made so as not to display the message, unnecessary response can be omitted, thereby enhancing the convenience. Particularly, if the software is to be used for the purpose of back-up, the existing file can be backed up without letting the user perceive the operation.

Here, in this example, the archive file is placed at the same location as the existing file (FIG. 7); however, the archive files may be stored together at a specified location.

The processes have been described as a function within an application. However, a program may be let to stand at all times on a memory of an operating system (OS) so as to monitor execution of a similar overwriting process in other applications, and processes similar to those described above may be executed when that event occurs (it may have a form such that the function is effective only for the different applications that are started from the application on which the present function is mounted).

Next, a method of restoring an existing file stored in an archive file will be described.

Figure 8:
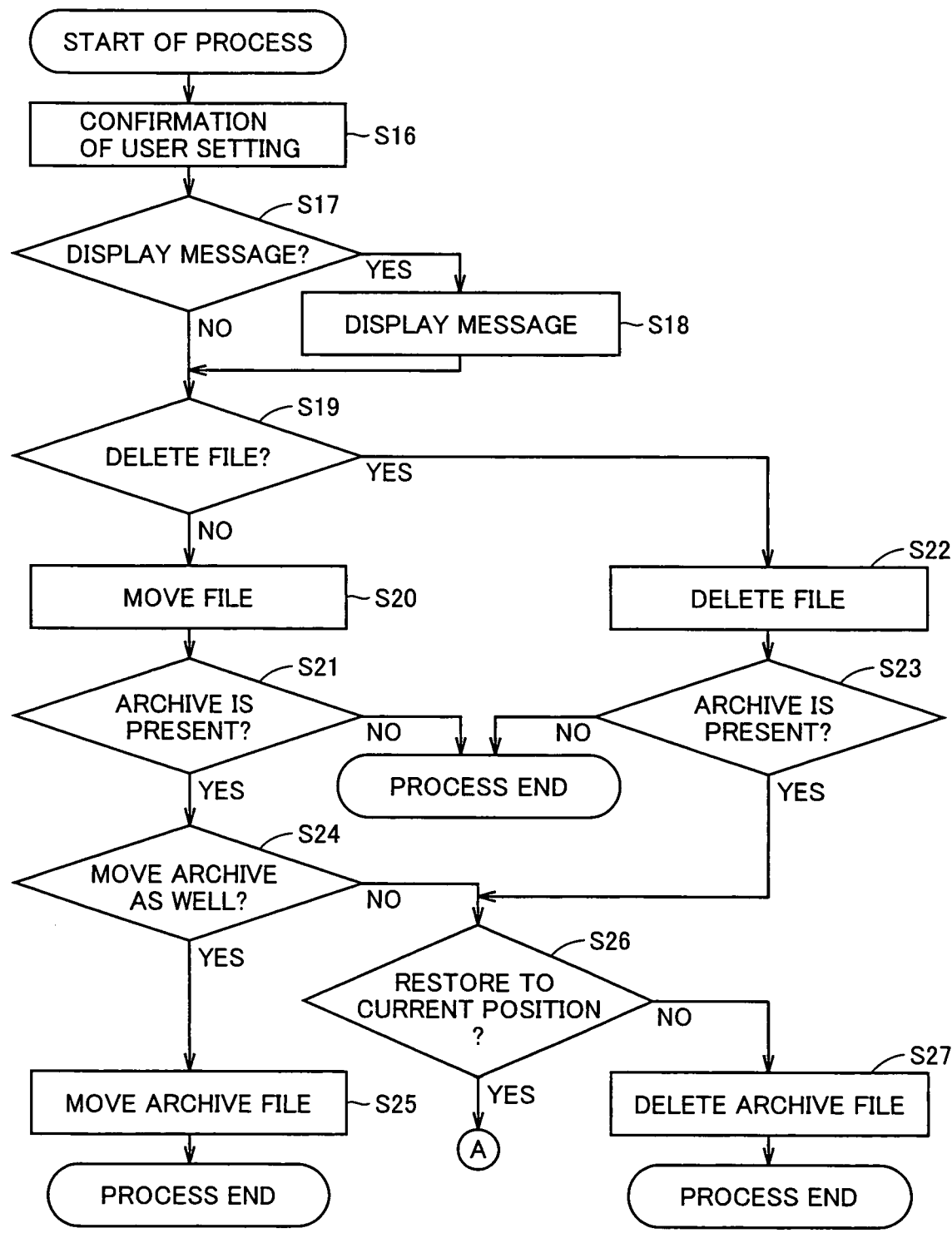
FIG. 8 is a flowchart showing processes executed in moving or deleting a file.

FIGS. 8 and 9 are flowcharts showing processes executed in moving or deleting files.

When it is understood that a file is to be moved or deleted, the processing routine shown in FIGS. 8 and 9 is started. First, the program confirms user's setting information (S16). This setting information is the information that is set by a user on the screen of FIG. 10 or 11. The setting information determines in advance the operations at the time of moving and deleting. The information is prepared in an application program.

First, the operation at the time of moving a file will be described.

On the screen shown in FIG. 10, the operation of the archive file at the time of moving the file is set as user-defined value setting.

Here, the user can select a desired process from among the processes of (1) moving the archive file together with the file, (2) restoring a file from the archive to the current position, and (3) deleting the archive file.

When the process of (2) is selected, the user can further select a desired process from among the processes of (a) restoring an arbitrary file from the list of files in the archive and (b) restoring the newest file in the archive.

Further, the user can select whether or not to delete the archive file after the restoration, and whether or not this message is to be displayed each time the movement process is executed.

Namely, the user can select any one of the following, roughly classified, three processes.

Namely, the user can select any one of the following, roughly classified, three processes.

(1) move the archive file together with the file to the movement destination of the file (2) restore one file from the archive file into the current folder (the originally existing file which is an object of movement is moved to a designated position)

(3) delete the archive file when the file is moved

These settings may be set by the user every time the movement is executed; however, as shown in FIG. 10, a setting of not displaying the message may be provided so that the processes may be carried out using this setting as defined values without asking the user again. This produces an effect of enhancing the convenience for the user.

Returning to the flowchart of FIG. 8, first the user's set value that is set on the screen such as shown in FIG. 10 is confirmed (S16) and, if it is set that the message is to be displayed (YES in S17), the message such as in FIG. 10 is displayed (S18). Here, the user can set an arbitrary process again.

Here, an example of movement is described, so that the procedure goes to a processing routine of not deleting the file (NO) by the step of determining whether the file is to be deleted or not (S19).

Then, the file is moved to a location designated by the user (S20). Next, it is determined whether an archive is present in the folder of the movement source (S21) and, if the archive is not present, the process is ended here. If the archive is present, it is confirmed whether there is a setting to move the archive as well (S24) and, if it is set so, the archive is moved together with the file (S25), and the process is ended. If it is not set so, it is confirmed whether or not a file in the archive is to be restored into the folder of the movement source (S26). If the answer is negative, it is assumed that the archive is to be deleted, so that the archive file is deleted (S27), and the process is ended.

Figures 11, 12:
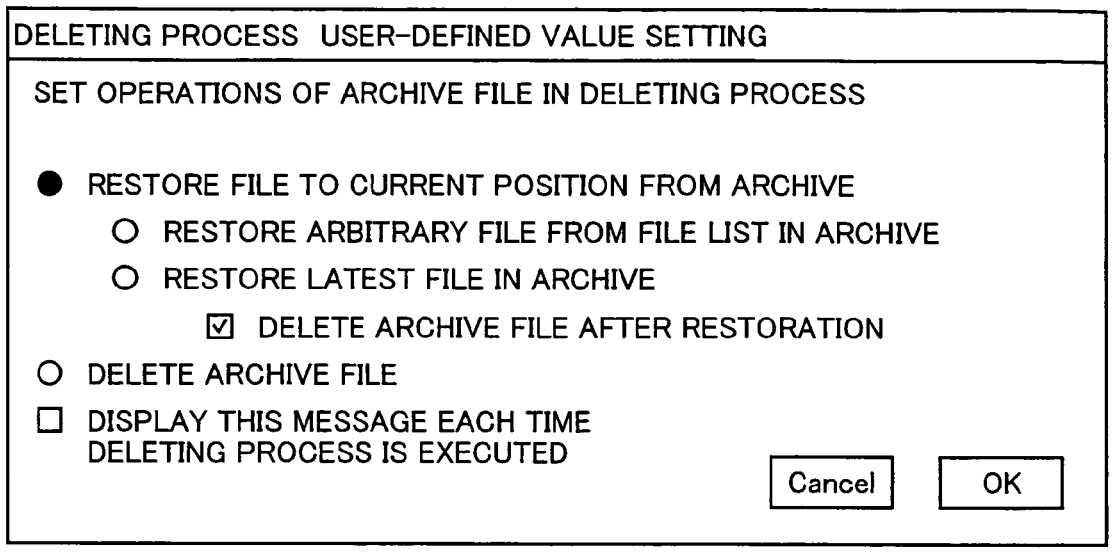
FIG. 11 is a view illustrating a user-defined value setting screen for a deleting process.
FIG. 12 is a view illustrating a screen displaying a list of files in an archive.

If it is set to restore a file (YES in S26), it is confirmed whether there is a setting such that the user can select an arbitrary file (S28 in FIG. 9) and, if it is set so, the files in the archive are displayed in a form of a list such as shown in FIG. 12, so as to display a screen on which the user can select one arbitrary file (S30). Here, the user is let to select a file (S31).

If it is set that the user is not to select a file (NO in S28), it is assumed that the newest file in the archive is designated, so that the designated file is restored (S32). Here, as one example of a predetermined rule, the newest file has been raised as an example; however, an arbitrary rule may be implemented.

After the restoration of the file, it is confirmed whether the archive is to be retained as it is or to be deleted (S33) and, if it is set that the archive is to be deleted, the archive file is deleted (S34), and the process is ended.

It is assumed here that one arbitrary file is selected and restored; however, a plurality of files may be selected and restored.

Next, the operation at the time of deleting a file will be described.

On the screen shown in FIG. 11, the operation of the archive file at the time of deleting the file is set as user-defined value setting.

Here, the user can select a desired process from among the processes of (1) restoring a file from the archive to the current position and (2) deleting the archive file.

When the process of (1) is selected, the user can further select a desired process from among the processes of (a) restoring an arbitrary file from the list of files in the archive and (b) restoring the newest file in the archive.

Further, the user can select whether or not to delete the archive file after the restoration, and whether or not this message is to be displayed each time the deletion process is executed.

Namely, the user can select any one of the following, roughly classified, two processes.

(1) restore one file from the archive file into the current folder (the originally existing file is deleted)

(2) delete the archive file together with the file

These settings may be set by the user every time the deletion is executed; however, as shown in FIG. 11, a setting of not displaying the message may be provided so that the processes may be carried out using this setting as defined values without asking the user again. This produces an effect of enhancing the convenience for the user.

The operation will be described with reference to the flowcharts shown in FIGS. 8 and 9 in the same manner as in the movement process; however, the parts of the description that are duplicated with those of the movement process will not be given.

In the operation at the time of deletion, the setting on the screen of FIG. 11 is confirmed in the confirmation of the user's setting in step S16. The processes that are different from those of the movement operation are only the parts from steps S19 to S26.

First, it is confirmed whether the file is to be deleted or not (S19) and, since the answer is YES here, the file is deleted (S22). If the deleted file is not associated with an archive file (NO in S23), the process is ended here. If the archive file is present, it is determined whether a file is to be restored into the current folder where the archive is present (S26). The subsequent processes are identical to the processes at the time of movement, so that the description thereof will not be repeated.

By the above-described restoration process, the original state can be restored even if an erroneous overwriting process is carried out. Namely, if a general tape back-up software is used, one must set to rewrite files to restore the past state using an exclusive-use software and execute a restoration process by preparing the relevant tape. On the other hand, according to the present invention, the original state can be easily restored simply by deleting or moving the file that the user wishes to rewrite. This eliminates the need for the user to perceive the system itself called back-up, thereby saving labor and preventing induced occurrence of mistakes.

Others

Here, in the above-described embodiments, the already existing file is stored into an archive when a file is overwritten; however, instead of this, the file to be overwritten (the new file) may be stored into the archive.

Further, in the above-described embodiments, as the condition for the "overwriting" to occur, the time when a file having the same name is newly added into the same folder is raised; however, the concept of "overwriting" is not limited to this alone. For example, one can determine that the "overwriting" is to be carried out when the icon of a new file is superposed by dragging and dropping on the icon of a file displayed on the display, and the already existing file may be stored into an archive. Alternatively, the dragged and dropped file may be stored into the archive.

In addition, when the icon of a file called B is dragged and dropped on the icon of a file called A, both of the files of file A and file B may be stored into an archive (At this time, the file A or the file B remains as an icon). When the icon of file C is further dragged and dropped, the file C is appended into the archive, so that the file of A+B+C is stored into the archive.

Further, the "archive" may simply store the text of the file by appending, or may store the file after performing a compression process. It is preferable that at least the contents of the original file and the name of the original file are recorded in the archive.

Here, the icon of the archive may not be displayed at ordinary times, or may be displayed in a normal state. If it is set that the icon of the archive file is not displayed, erroneous operation of the user can be prevented, whereas if it is set that the icon is displayed, the user can use the archive file in an arbitrary manner.

Effects Produced in the Embodiments

As described above, according to the present embodiments, the original file can be prevented from being lost by overwriting of the file, so that the file can be protected. Further, by setting the operation at the time of overwriting storage in advance, the overwriting storage of a plurality of files can be executed without interruption without displaying a message to prompt the user to pay attention at the time of overwriting.

Namely, in the file management system according to the present embodiments, a concept of archive is used, so that a plurality of existing files can be stored into one archive file. When a user attempts to store a file having the same name by overwriting, the new file having the same name is stored after the existing file having the same name is stored into an archive. Thereafter, when a user attempts to store another new file having the same name, the former file having the same name is stored into the archive file by appending.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer-readable recording medium having a file management program product stored thereon that makes a computer execute:
    an inputting step of receiving an input for writing a second file over a first file for storage, said second file having a same name as said first file;
    an archive file creation step of creating a unique archive file for said first file when said first file is to be overwritten according to the received input of overwriting storage, and storing said unique archive file in the same file location at which said first file to be overwritten is stored;
    a storing step of storing said first file by appending into said unique archive file, wherein said storing step is able to store a plurality of files in said unique archive file, and said first file is appended as a newly stored file into said unique archive file including previously stored files having same file name;
    an overwriting step of overwriting said first file with said second file after said first file is stored in said unique archive file; and
    a restoring step of restoring said first file stored in said unique archive file when said second file is moved or deleted from the file location at which said unique archive file is stored.

2. The computer-readable recording medium according to claim 1, wherein
    said inputting step comprises operating under the assumption that said input of overwriting storage is received when said second file to be newly stored has the same file name as said first file or when a display of said second file is superposed on a display of said first file.

3. The computer-readable recording medium according to claim 1, wherein said file management program product makes the computer further execute:
    an archive file naming step of obtaining a name of said archive file by changing only an extension of a file name of the file to be stored in said archive file.

4. The computer-readable recording medium according to claim 1, wherein said file management program product makes the computer further execute:
    a setting step of setting operations of overwriting storage in advance.

5. The computer-readable recording medium according to claim 1, wherein said file management program product makes the computer further execute:
    a setting step of setting a storage condition of the file to be stored into said archive file,
    wherein said storing step comprises storing the file in accordance with said storage condition set in said setting step.

6. The computer-readable recording medium according to claim 1, wherein said file management program product makes the computer further execute:
    a setting step of setting a restore condition of said first file to be restored,
    wherein said restoring step restores said first file in accordance with said restore condition set in said setting step.

7. The computer-readable recording medium according to claim 6, wherein said file management program product makes the computer further execute:
    a prompting step of prompting a user of the computer whether said first file is to be automatically restored,
    wherein, if the response is negative, the archive file is deleted.

8. The computer-readable recording medium according to claim 1, wherein said file management program makes said computer further execute:
    a compression step of compressing the size of said first file when said first file is to be overwritten according to the received input of overwriting storage,
    wherein the storing step stores said compressed first file into said unique archive file.

9. The computer-readable recording medium according to claim 8, wherein
    said compression step comprises performing a suitable compression depending on a kind of the file to be compressed.

10. The computer readable recording medium according to claim 1, wherein the restoring step displays a screen on which a user can select said first file in said unique archive file and restores said selected first file.

11. A file management method comprising:
    an inputting step of receiving an input for writing a second file over a first file for storage, said second file having a same name as said first file;
    an archive file creation step of creating a unique archive file for said first file when said first file is to be overwritten according to the received input of overwriting storage, and storing said unique archive file in the same file location at which said first file to be overwritten is stored;
    a storing step of storing said first file by appending into said unique archive file when said input of overwriting storage is received, wherein said storing step is able to store a plurality of files in said unique archive file, and said first file is appended as a newly stored file into said unique archive file including previously stored files having same file name;
    an overwriting step of overwriting said first file with said second file after said first file is stored in said unique archive file; and a restoring step of restoring said first file stored in said unique archive file when said second file is moved or deleted from the file location at which said unique archive file is stored.

12. The file management method according to claim 11, wherein
said inputting step comprises operating under the assumption that said input of overwriting storage is received when said second file to be newly stored has the same file name as said first file or when a display of said second file is superposed on a display of said first file.

13. The file management method according to claim 11, further comprising:
an archive file naming step of obtaining a name of said archive file by changing only an extension of a file name of the file to be stored in said archive file.

14. The file management method according to claim 11, further comprising:
a setting step of setting operations of overwriting storage in advance.

15. The file management method according to claim 11, further comprising:
a setting step of setting a storage condition of the file to be stored into said archive file,
wherein said storing step stores the file in accordance with said storage condition set in said setting step.

16. The file management method according to claim 11, further comprising:
a setting step of setting a restore condition of said first file to be restored,
wherein said restoring step restores said first file in accordance with said restore condition set in said setting step.

17. The file management method according to claim 16, further comprising:
a prompting step of prompting a user whether said first file is to be automatically restored,
wherein, if the response is negative, the archive file is deleted.

18. The file management method according to claim 11, further comprising:
a compression step of compressing the size of said first file when said first file is to be overwritten according to the received input of overwriting storage,
wherein the storing step stores said compressed first file into said unique archive file.

19. The file management method according to claim 18, wherein
said compression step comprises performing a suitable compression depending on a kind of the file to be compressed.

20. The file management method according to claim 11, wherein the restoring step displays a screen on which a user can select said first file in said unique archive file and restores said selected first file.

\* \* \* \* \*